Patented July 13, 1943

2,323,948

UNITED STATES PATENT OFFICE 2,323,948

PROCESS FOR PREPARING PHENYLENE-
DIAMINE DERIVATIVES

Harold Von Bramer, Lee G. Davy, and Milton L. Clemens, Jr., Kingsport, Tenn., assignors to Eastman Kodak Company, Rochester, N. Y., a corporation of New Jersey No Drawing. Application November 6, 1940,
Serial No. 364,564

8 Claims. (Cl. 260—577)

This invention relates to the preparation of phenylenediamine derivatives, and more particularly to the preparation of symmetrically substituted phenylenediamine derivatives, e. g., N,N'-di-alkyl-p-phenylenediamide derivatives.

It is known that aromatic amines, such as aniline, can be alkylated by a reductive alkylation process comprising treating a mixture of the amine and a carbonyl compound, such as an aldehyde or a ketone, with hydrogen in the presence of a nickel catalyst. This method has been extended to polyamines. N,N'-di-isopropyl-p-phenylenediamine has been produced from p-phenylenediamine and acetone, in the presence of a platinum oxide catalyst.

However, in the case of the reductive alkylation of p-phenylenediamine, in the presence of a nickel catalyst, considerable hydrogenation of the aromatic ring occurs, so that the reaction product contains a great deal of 1,4-diaminocyclohexane derivatives; while with a platinum oxide catalyst, the yields of symmetrically substituted phenylenediamine derivatives are ordinarily low, the reaction product containing considerable amounts of monoalkylated phenylenediamines, as well as considerable amounts of non-alkylated phenylenediamine, so that isolation of the symmetrically substituted derivatives is very difficult, if not impossible. Moreover, the use of platinum catalysts in large scale production has a serious economic drawback.

It is accordingly an object of our invention to provide a new process for preparing symmetrically substituted phenylenediamine derivatives. Other objects will become apparent hereinafter.

In accordance with our invention, we treat a mixture of a p-phenylenediamine and a carbonyl compound, such as an aldehyde or ketone, with hydrogen, in the presence of a catalyst comprising a mixture of an oxide hydrogenating catalyst, an oxide hydrating catalyst and an oxide selected from the group consisting of oxides of magnesium, calcium, strontium and barium.

Advantageously, we employ a catalyst consisting of an intimate mixture of copper oxide, chromium oxide and barium oxide. Instead of copper oxide as the hydrogenating oxide, we can employ oxides of zinc, tin, silver, molybdenum, nickel or manganese. Instead of chromium oxide as hydrating oxide, we can employ oxides of silicon, aluminum, thorium or phosphorous. Of course, our catalyst can contain one or more oxide hydrogenating catalyst, one or more oxide hydrating catalyst, and one or more oxides selected from the group consisting of oxides of magnesium, calcium, strontium, and barium.

To prepare the preferred catalyst, the following process is advantageously employed. A mixture of one mole of copper nitrate trihydrate, one mole of chromium nitrate pentadechydrate and one-tenth mole of barium nitrate was dissolved in the minimum amount of water and carefully evaporated to dryness. The residue of intimately mixed nitrates was decomposed by heating gently to the lowest temperature at which decomposition of the nitrates to the corresponding oxides took place, pains being taken to prevent a rise in temperature to dull red heat. The lower the temperature of the decomposition, the greater the activity of the catalyst, provided that undecomposed nitrates are removed from the catalyst before use. The nitrates can conveniently be removed by thorough washing. While, in general, the proportions of oxides set forth above, viz. 10:10:1 molar proportions, are preferred, other proportions can be used. The amount of catalyst used is advantageously from about 0.5% to about 10% of the weight of the mixture of p-phenylenediamine and carbonyl compound.

The molar ratio of carbonyl compound to p-phenylenediamine is advantageously more than 2:1, and is preferably between about 2:1 and about 10:1. The temperature employed is advantageously between about 100° C. and about 250° C., and is preferably between about 150° C. and about 200° C. The hydrogen pressure employed is advantageously between about 10 and about 200 atmospheres, and is preferably between about 35 and about 120 atmospheres, one atmosphere being equivalent to 14.7 pounds per square inch.

The following examples will serve to illustrate our process.

*Example 1.—N,N'-di-(secondary butyl)-p-phenylenediamine*

54 g. (0.5 mole) of p-phenylenediamine were dissolved in 288 g. (4 moles) of methyl ethyl ketone. 2 g. of a catalyst consisting of an intimate mixture of copper oxide, chromium oxide, and barium oxide were added to the solution.

The resulting mixture was placed in a suitable autoclave and submitted to hydrogenation, under a pressure of 35 to 55 atmospheres of hydrogen at 155° C. After absorption of the hydrogen had ceased, the reaction mixture was cooled, removed from the autoclave, the catalyst filtered off, and the resulting solution evaporated under a vacuum of approximately 20 mm. of mercury, at 140° C., in order to remove water, secondary butyl alcohol and excess methyl ethyl ketone. The residue of crude phenylenediamine derivative weighed 110 g. This yield is equal to the theoretical quantity of N,N'-di-(secondary butyl)-p-phenylenediamine. The crude material was subjected to distillation at from 0.1 to 0.2 mm. of mercury, and obtained as a nearly colorless, viscid liquid. A portion of the product was dissolved in a hydrocarbon solvent and carbon dioxide was passed into the solution. No precipitate formed, showing the absence of 1,4-diaminocyclohexane derivatives.

On the other hand, using the same amounts of methyl ethyl ketone and p-phenylenediamine and the same conditions of hydrogen pressure and of temperature, but using 2 g. of Raney nickel as catalyst instead of the oxide catalyst, only 95 g. of crude material were obtained. Upon distillation of this crude material at 0.5 mm. of mercury, a clear, pale yellow, viscid liquid was obtained. When the product was dissolved in a hydrocarbon solvent and the resulting solution was treated with carbon dioxide, a copious white precipitate formed, showing the presence of large amounts of 1,4-diaminocyclohexane derivatives.

From the foregoing comparison of the reaction product obtained using our oxide catalyst, with the reaction product obtained using Raney nickel catalyst, the superiority of our new process is apparent.

*Example 2.—N,N'-di-isopropyl-p-phenylenediamine*

54 g. (0.5 mole) of p-phenylenediamine were dissolved in 232 g. (4 moles) of acetone. 4 g. of a catalyst, composed of an intimate mixture of copper, chromium and barium oxides, were added to the solution. The resulting solution was placed in a suitable autoclave and submitted to hydrogenation under a pressure of 35 to 55 atmospheres of hydrogen, at about 150° C. The reaction mixture was cooled, removed from the autoclave, the catalyst filtered off, and the resulting solution evaporated under a vacuum of about 50 mm. of mercury, in order to remove water, isopropyl, alcohol and excess acetone. The residue of crude phenylenediamine derivative was distilled under a vacuum of 0.1 to 0.2 mm. of mercury, and was obtained as a colorless, viscid liquid which solidified upon standing.

In a manner similar to that illustrated in the foregoing examples, p-phenylenediamine can be reductively alkylated using diethyl ketone, methyl normal propyl ketone, methyl primary normal butyl ketone, methyl secondary butyl ketone, methyl isobutyl ketone, methyl tertiary butyl ketone, all the methyl amyl ketones, acetophenone and cyclohexanone. Likewise, in a manner similar to that illustrated in the foregoing examples, p-phenylenediamine can be reductively alkylated using acetaldehyde, propionaldehyde, n-butyraldehyde, isobutyraldehyde, the isomeric valeraldehydes, benzaldehyde, hexahydrobenzaldehyde, or phenylacetaldehyde. However, when aldehydes are employed, alkylation proceeds to stages beyond the symmetrically di-substituted phenylenediamines, unless the reaction is controlled by lowering the temperature and hydrogen pressure, so as to interrupt the reaction when the required amount of hydrogen has been absorbed. This tendency for alkylation to go beyond the symmetrically di-substituted derivatives appears to be substantially absent when ketones are employed.

As starting materials for our process we may use a mixture of p-nitroaniline and a carbonyl compound, such as an aldehyde or a ketone, since, in the presence of the oxide catalyst, the p-nitroaniline is reduced to p-phenylenediamine which then is reductively alkylated. When operating in this manner, it is advantageous to operate at about 140° C., until the nitro groups are substantially all reduced to amino groups, and then to adjust the temperature to that which is most suitable for completing the reductive alkylation of the p-phenylenediamine.

The phenylenediamine derivatives prepared in accordance with our new process retard the deterioration of cracked gasoline when incorporated therein. However, the derivatives prepared from aldehydes are of no practical utility in this respect since they induce very bad color in the gasoline. The derivatives prepared from ketones, on the other hand, are remarkable in that gasolines containing them remain colorless, even after months of exposure to air and light. Any of the derivatives obtainable by our process can be employed as dye intermediates.

What we claim as our invention and desire to be secured by Letters Patent of the United States is:

1. A process for preparing phenylenediamine derivatives comprising treating a mixture of an aromatic amino compound selected from the group consisting of p-phenylenediamine and p-nitroaniline and a carbonyl compound selected from the group consisting of aldehydes and ketones, with hydrogen, in the presence of a catalyst comprising essentially an intimate mixture of copper oxide, chromium oxide, and barium oxide.

2. A process for preparing phenylenediamine derivatives comprising treating a mixture of an aromatic amino compound selected from the group consisting of p-phenylenediamine and p-nitroaniline and a carbonyl compound selected from the group consisting of aldehydes and ketones, with hydrogen, in the presence of from 0.5% to about 10% by weight of a mixture of p-phenylenediamine and carbonyl compound, of a catalyst comprising essentially an intimate mixture of copper oxide, chromium oxide, and barium oxide.

3. A process for preparing phenylenediamine derivatives comprising treating a mixture of one molecular proportion of an aromatic amino compound selected from the group consisting of p-phenylenediamine and p-nitroaniline and at least two molecular proportions of a carbonyl compound selected from the group consisting of aldehydes and ketones, with hydrogen, in the presence of a catalyst comprising essentially an intimate mixture of copper oxide, chromium oxide, and barium oxide.

4. A process for preparing phenylenediamine derivatives comprising treating a mixture of one molecular proportion of an aromatic amino compound selected from the group consisting of p-phenylenediamine and p-nitroaniline with at least two molecular proportions of a carbonyl compound selected from the group consisting of aldehydes and ketones, with hydrogen, in the presence of from about 0.5% to about 10% by weight of the mixture of the aromatic amino compound and carbonyl compound, of a catalyst comprising essentially an intimate mixture of copper oxide, chromium oxide, and barium oxide.

5. A process for preparing phenylenediamine derivatives comprising treating a mixture of one molecular proportion of an aromatic amino compound selected from the group consisting of p-phenylenediamine and p-nitroaniline with at least two molecular proportions of a carbonyl compound selected from the group consisting of aldehydes and ketones, with hydrogen, at a temperature of from about 100° C. to about 250° C. and a hydrogen pressure of from about 10 to about 200 atmospheres, in the presence of from about 0.5% to about 10% by weight of the mixture of the aromatic amino compound and carbonyl compound, of a catalyst comprising essentially an intimate mixture of copper oxide, chromium oxide, and barium oxide.

6. A process for preparing phenylenediamine derivatives comprising treating a mixture of one molecular proportion of an aromatic amino compound selected from the group consisting of p-phenylenediamine and p-nitroaniline with at least two molecular proportions of a carbonyl compound selected from the group consisting of aldehydes and ketones, with hydrogen, at a temperature of from about 100° to about 250° C. and a hydrogen pressure of from about 10 to about 200 atmospheres, in the presence of from about 0.5% to about 10% by weight of the mixture of the aromatic amino compound and carbonyl compound, of a catalyst comprising essentially an intimate mixture of copper oxide, chromium oxide, and barium oxide, the molecular proportions of said oxides being 10:10:1 respectively.

7. A process for preparing phenylenediamine derivatives comprising treating a mixture of one molecular proportion of p-nitroaniline with at least two molecular proportions of a carbonyl compound selected from the group consisting of aldehydes and ketones, with hydrogen, at a temperature of from about 100° to about 250° C. and a hydrogen pressure of from about 10 to 200 atmospheres, in the presence of from about 0.5% to about 10% by weight of the mixture of p-nitroaniline and carbonyl compound, of a catalyst comprising essentially an intimate mixture of copper oxide, chromium oxide, and barium oxide.

8. A process for preparing phenylenediamine derivatives comprising treating a mixture of one molecular proportion of p-phenylenediamine and from about 2 to about 10 molecular proportions of an aliphatic ketone, with hydrogen, at a temperature of from about 100° C. to about 250° C. and a hydrogen pressure of from about 10 to about 200 atmospheres, in the presence of from 5% to about 10% by weight of the mixture of p-phenylenediamine and ketone, of a catalyst comprising essentially an intimate mixture of copper oxide, chromium oxide, and barium oxide.

HAROLD VON BRAMER.
LEE G. DAVY.
MILTON L. CLEMENS, Jr.